United States Patent Office 3,373,029
Patented Mar. 12, 1968

3,373,029
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 561,393, June 29, 1966. This application Mar. 3, 1967, Ser. No. 620,263
10 Claims. (Cl. 99—2)

ABSTRACT OF THE DISCLOSURE

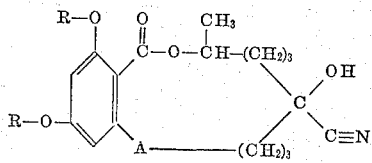

where R is selected from the group consisting of hydrogen, lower alkyl and benzyl and A is a radical selected from the group consisting of —CH=CH— and —CH$_2$—CH$_2$—; and animal feeds containing growth promoting amounts thereof.

---

This application is a continuation-in-part of application Ser. No. 561,393, filed June 29, 1966, now abandoned.

The present invention relates to new compounds and an object of the present invention is to provide compounds which exhibit estrogenic activity or aid in increasing the rate of growth in meat-producing animals, e.g., cattle, lamb and swine.

The compounds of this invention are illustrated by the formula:

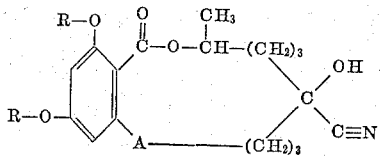

where A is —CH$_2$—CH$_2$— or —CH=CH—; and R is hydrogen or substituted or unsubstituted alkyl, e.g., lower alkyl such as methyl, ethyl, hexyl, etc.; or aralkyl such as benzyl.

The compounds of the present invention can be produced from the compound:

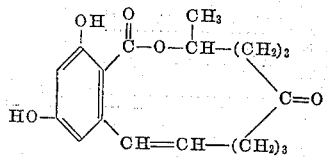

hereinafter referred to as the fermentation estrogenic substance (F.E.S.) by reaction thereof with sodium cyanide and a mineral acid, e.g., sulfuric, hydrochloric, etc., in aqueous solution. The hydroxyl groups can be converted to ethers, e.g., methyl ethers, as taught in U.S. Patent 3,239,342. Compounds where R is benzyl are described in copending application Ser. No. 532,113, filed Mar. 7, 1966, and application Ser. No. 620,259, filed Mar. 3, 1967, now abandoned, and dihydro F.E.S. compounds are described in U.S. Patent 3,239,354. The compounds of this invention in addition to their own activity are useful intermediates in the production of F.E.S. amines similar to those described in U.S. Patent 3,239,346 upon reduction, for example, with hydrogen and Raney nickel. Care must be taken in the production of these compounds since hydrogen cyanide is released.

The compounds can also be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle include alfalfa hay and ground corn cobs together with supplementary vitaminaceous substances if desired.

The following examples serve to illustrate the invention.

Example I

F.E.S. is mixed with an aqueous solution of sodium cyanide and sulfuric acid is slowly added while the temperature is maintained at 10 to 20° C., to produce the cyanohydrin derivative.

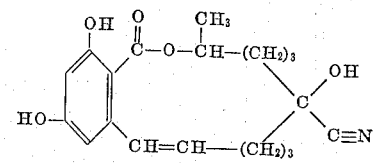

Example II

Dihydro F.E.S., F.E.S., 2,4-dimethylether, and F.E.S. 4-benzylether are treated as described in Example I to produce the corresponding cyanohydrin.

Example III

The product of Example I is reduced with Raney nickel at 4 atm. hydrogen in methanol to produce:

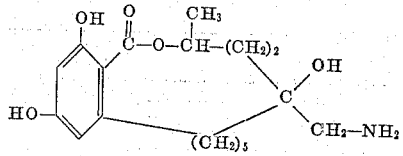

Example IV

Six head of cattle are fed a daily ration of alfalfa hay and ground corn cobs containing from 5 to 20 ounces per 100 pounds of feed of the compound of Example I and their rate of growth is improved.

Example V

Six head of cattle are fed a daily ration of alfalfa hay and ground corn cobs containing from 5 to 20 ounces per 100 pounds of feed of the compound of Example III and their rate of growth is improved.

The following are specific examples of animal feed compositions of this invention useful for increasing the rate of growth and feed efficiency of young animals to market weight.

Example VI

For young beef cattle, i.e., calves to yearlings running to two year olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Molasses of dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMIU/ton | 2–4 |

(NOTE: Milo or corn, for example, can be substituted for the barley.)

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example VII

For young swine, i.e., six week old pigs to about 100 pound pigs, each animal is given 5 to 20 milligrams per day of the compound of Example III intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example III intimately admixed in about 5½ to 10 pounds per head per day of a finisher ration until it reaches market weight of about 220 pounds. The grower and finisher ration include in addition to the compound of Example III the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Groud Limestone | 0.5 | 0.3 |
| Iodized Salt | 0.5 | 0.5 |
| Vitamin, Antibiotic and Trace Mineral Premix | 0.5 | 0.5 |

The compound of Example III is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

Example VIII

For 4 to 10 month old lambs weighing 50 to 70 pounds, each animal is given 1 to 15 milligrams per day of the compound of Example I, intimately admixed in about 3 to 6 pounds per head per day of a complete ration for 30 to 90 days. The complete ration includes in addition to the compound of Example I the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example I is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

Example IX

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example III in the grower and finisher feed each of which includes in addition to the compound of Example III the following:

| | Grower (lbs.) | Finisher (lbs.) |
|---|---|---|
| Groud Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trace Minerals and Antibiotics | 10 | 10 |

It is claimed:

1. 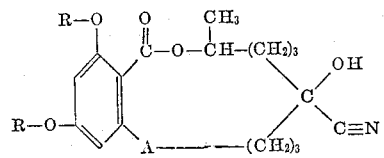

where R is selected from the group consisting of hydrogen, lower alkyl and benzyl and A is a radical selected from the group consisting of —CH=CH— and

—CH$_2$—CH$_2$—

2. The compound of claim 1 wherein A is

—CH=CH—

3. The compound of claim 2 wherein R is hydrogen.
4. The compound of claim 2 wherein R is lower alkyl.
5. The compound of claim 2 wherein R is benzyl.
6. The compound of claim 1 wherein A is $$-CH_2-CH_2-$$

7. The compound of claim 6 wherein R is hydrogen.
8. The compound of claim 6 wherein R is lower alkyl.
9. The compound of claim 6 wherein R is benzyl.
10. An animal feed composition comprising a nutrient ration and a growth promoting amount of the compound of claim 1.

No references cited.

A. LOUIS MONACELL, *Primary Examiner.*

H. H. KLARE III, *Assistant Examiner.*